United States Patent
Laakso

(10) Patent No.: US 10,654,591 B2
(45) Date of Patent: May 19, 2020

(54) PRECISION APPROACH PATH INDICATOR WITH A NOVEL REFLECTOR ARRANGEMENT

(71) Applicant: Obelux Oy, Helsinki (FI)

(72) Inventor: Vesa Laakso, Helsinki (FI)

(73) Assignee: Obelux Oy, Helsinki (FI)

( * ) Notice: Subject to any disclaimer, the term of this patent is extended or adjusted under 35 U.S.C. 154(b) by 0 days.

(21) Appl. No.: 15/764,329

(22) PCT Filed: Sep. 23, 2016

(86) PCT No.: PCT/FI2016/050664
§ 371 (c)(1),
(2) Date: Mar. 29, 2018

(87) PCT Pub. No.: WO2017/055681
PCT Pub. Date: Apr. 6, 2017

(65) Prior Publication Data
US 2018/0273205 A1  Sep. 27, 2018

(30) Foreign Application Priority Data
Sep. 29, 2015  (FI) ..................................... 20155689

(51) Int. Cl.
*B64F 1/20* (2006.01)
*F21V 13/14* (2006.01)
*F21V 5/04* (2006.01)
*F21V 7/05* (2006.01)
*F21V 7/06* (2006.01)
(Continued)

(52) U.S. Cl.
CPC .................. *B64F 1/20* (2013.01); *F21V 5/04* (2013.01); *F21V 7/0008* (2013.01); *F21V 7/0033* (2013.01); *F21V 7/05* (2013.01); *F21V 7/06* (2013.01); *F21V 9/00* (2013.01); *F21V 13/14* (2013.01); *F21W 2111/06* (2013.01); *F21Y 2105/10* (2016.08); *F21Y 2113/10* (2016.08);
(Continued)

(58) Field of Classification Search
CPC ........ F21V 5/04; F21V 7/0008; F21V 7/0033; F21V 7/05; F21V 7/06; F21V 9/00; F21V 13/14; F21W 2111/06; B64F 1/20
See application file for complete search history.

(56) References Cited

U.S. PATENT DOCUMENTS 2,570,137 A    10/1951   Mackay
3,191,146 A *   6/1965   Mitchell ................... B64F 1/20
                                             340/955

(Continued)

FOREIGN PATENT DOCUMENTS

BE          897787 A1    1/1984
CN    101737683 A    6/2010
(Continued)

*Primary Examiner* — Arman B Fallahkhair
(74) *Attorney, Agent, or Firm* — Laine IP Oy

(57) ABSTRACT

A compact PAPI having a semiconductor light source and finely distribution of lights is herein proposed. The novel PAPI includes two artificial light sources each with a plurality of semiconductor emitters as well as two concave and two planar reflectors, one for each artificial light source. The concave reflectors collect light emitted by the plurality of semiconductor emitters of the first and second artificial light sources and gather the collected light to the planar reflectors as output of the PAPI.

15 Claims, 5 Drawing Sheets

(51) Int. Cl.
  *F21V 7/00*       (2006.01)
  *F21V 9/00*       (2018.01)
  *F21W 111/06*     (2006.01)
  *F21Y 115/10*     (2016.01)
  *F21Y 105/10*     (2016.01)
  *F21Y 113/10*     (2016.01)
  *F21Y 113/13*     (2016.01)

(52) U.S. Cl.
  CPC ........ *F21Y 2113/13* (2016.08); *F21Y 2115/10* (2016.08)

(56) References Cited

U.S. PATENT DOCUMENTS

| | | | | |
|---|---|---|---|---|
| 3,279,406 | A * | 10/1966 | Ricketts | B64F 1/20 114/261 |
| 5,991,011 | A * | 11/1999 | Damm | G01S 7/497 356/5.01 |
| 6,239,725 | B1 * | 5/2001 | Bray | B64F 1/20 114/258 |
| 6,758,582 | B1 * | 7/2004 | Hsiao | F21V 7/0025 362/302 |
| 7,375,653 | B2 * | 5/2008 | Kaminski | B64F 1/20 340/953 |
| 7,535,380 | B2 * | 5/2009 | Bertin | B64F 1/20 340/907 |
| 2005/0073849 | A1 | 4/2005 | Rhoads et al. | |
| 2007/0115141 | A1 | 5/2007 | Kaminski et al. | |
| 2007/0217193 | A1 | 9/2007 | Lin et al. | |
| 2009/0168395 | A1 | 7/2009 | Mrakovich et al. | |
| 2009/0195395 | A1 | 8/2009 | Cannistra et al. | |
| 2011/0006920 | A1 | 1/2011 | Bauer | |
| 2015/0003054 | A1 | 1/2015 | Shemwell et al. | |

FOREIGN PATENT DOCUMENTS

| | | |
|---|---|---|
| CN | 102072466 A | 5/2011 |
| GB | 2127192 A | 4/1984 |
| WO | WO02097325 A1 | 12/2002 |

\* cited by examiner

PRECISION APPROACH PATH INDICATOR WITH A NOVEL REFLECTOR ARRANGEMENT

TECHNICAL FIELD

The present invention relates to ground installed visual landing aids for aircrafts. In particular, the invention relates to optical arrangements for precision approach path indicators using light-emitting diodes.

BACKGROUND

A precision approach path indicator, PAPI in short, is a light system, which is installed on the ground adjacent to a runway for providing visual indication of the position of an aircraft position on the glide path for approaching the runway in question. The PAPI is typically positioned on the left side of the runway so as to be seen up to eight kilometers in daylight and 32 kilometers in the dark. A conventional PAPI includes an optical arrangement configured to divide light output into two distinctive segments, red and white. Depending on the viewing angle during approach, the lights will appear either red or white. The color of the light, as seen by the pilot, conveys information concerning the conformity to the appropriate glide path for the aircraft. When there is an even split in red and white lights, the aircraft is on the correct glide path. If an aircraft is beneath the correct glide path, red lights will outnumber the white. Alternatively, if an aircraft is above the correct glide path, white lights outnumber the red.

PAPI's have conventionally employed artificial light sources that are based on incandescent light bulbs. As such bulbs suffer from poor efficiency and short life span, there has been a need to develop PAPI's running more efficient and robust light sources. PAPI's running light-emitting diodes (LED) have therefore been introduced. US 2007/0115141 A1, for example, discloses a PAPI with two LED arrays (16, 18) arranged at a distance from each other in an opposing manner to emit white and red light toward each other in one direction. Each individual LED includes a collimating or encapsulating optic between the opposing LED arrays (16, 18) is a mirror component (14) having a two planar mirror surfaces (32, 34) arranged in a respectively 90 degree angle so as to lie in a 45 degree angle relative to the LED arrays (16, 18). The planar mirror surfaces (32, 34) reflect the white and red light from the LED arrays (16, 18) toward a projection lens (22).

As the requirements for the light output of PAPI's is very strict, there remains a need to further develop the distribution of light intensity in a given glide angle. While it is necessary to satisfy the requirements of standards governing lines of constant light intensity, i.e. isocandela lines, it is desirable to pursue ever greater fidelity and sharpness in the distribution of light. One such standard is Annex 14 to the Convention International Civil Aviation ("Aerodromes Volume I—Aerodrome Design and Operations", Fifth Edition, July 2009 by the International Civil Aviation Organization). Because the source of light in an array of LEDs is not a point source but rather each array has a plurality of light sources, the required optics tend to be quite large to capture and guide the light in a desired fashion.

It is therefore an object of certain embodiments to provide a PAPI having a semiconductor light source that is not only compact in size but also has sharp distribution of lights.

SUMMARY

The aim is achieved with a novel precision approach path indicator (PAPI) including two artificial light sources each with a plurality of semiconductor emitters as well as two concave and two planar reflectors, one for each artificial light source. The concave reflectors collect light emitted by the plurality of semiconductor emitters of the first artificial light sources and gather the collected light to the planar reflectors as output of the PAPI.

The invention is defined by the features of the independent claim. Some specific embodiments are defined in the dependent claims.

Significant benefits are gained with aid of such PAPI. The distribution of light produced by the PAPI is greatly improved. The combination of a concave and planar reflector collect the artificial light from a plurality of sources into a beam, which is very effective and sharp. In other words, the light output is maximized. As the optical arrangement is small in size, it may be possible to double to the amount of light sources while maintaining the external dimensions of the PAPI. That way the PAPI may be normally run at half intensity thus reserving the possibility to increase the intensity of some light sources should one fail. Such an arrangement has the added benefit of increasing the robustness of the PAPI.

According to a specific embodiment the semiconductor emitters are domeless LEDs for further compacting the size of the device. While domeless LEDs do suffer from poorer efficiency than conventional LEDs, the compact size enables the use of more emitters per circuit board, which is beneficial for achieving great robustness.

DETAILED DESCRIPTION OF EXEMPLARY EMBODIMENTS

In the present context, the term "PAPI" is intended to mean a precision approach path indicator in general without limiting to a PAPI according to a given standard nor to specification of a given aviation association nor to special PAPIs intended for a specific application, such as APAPIs. A PAPI may refer to a device producing both the red and white light in a single enclosure or to a system including several enclosures enclosing the components for producing red and white light. For example, a PAPI may include one enclosure including the components for producing red light and another for producing white light, which enclosures are adapted to cooperate such to produce a similar output as a single-enclosure PAPI.

In the present context, the term "reflector" is intended to mean a device or a part thereof capable of providing total reflection of a light beam in the visible range. Therefore a parabolic reflector, for example, is not limited to a reflector having a reflecting surface, which is entirely parabolic. Instead, a parabolic reflector may take any form provided that it includes a reflecting surface, which comprises a parabolic reflecting section.

In the present context, the term "planar reflector" is intended to mean a device including a reflecting surface, at least a section of which is generally planar. It is to be understood that the word planar covers not only mathematical planes with and without deviations within common flatness tolerances but also curved reflecting surfaces provided that the reflecting surface does not significantly focus or dissipate the reflected light beams in view of the given purpose of the planar reflector in question.

In the present context, the term "LED" is intended to mean a single semiconducting emitter, which may or may not be part of a surface-mounted LED element comprising several emitters.

Figure 1:
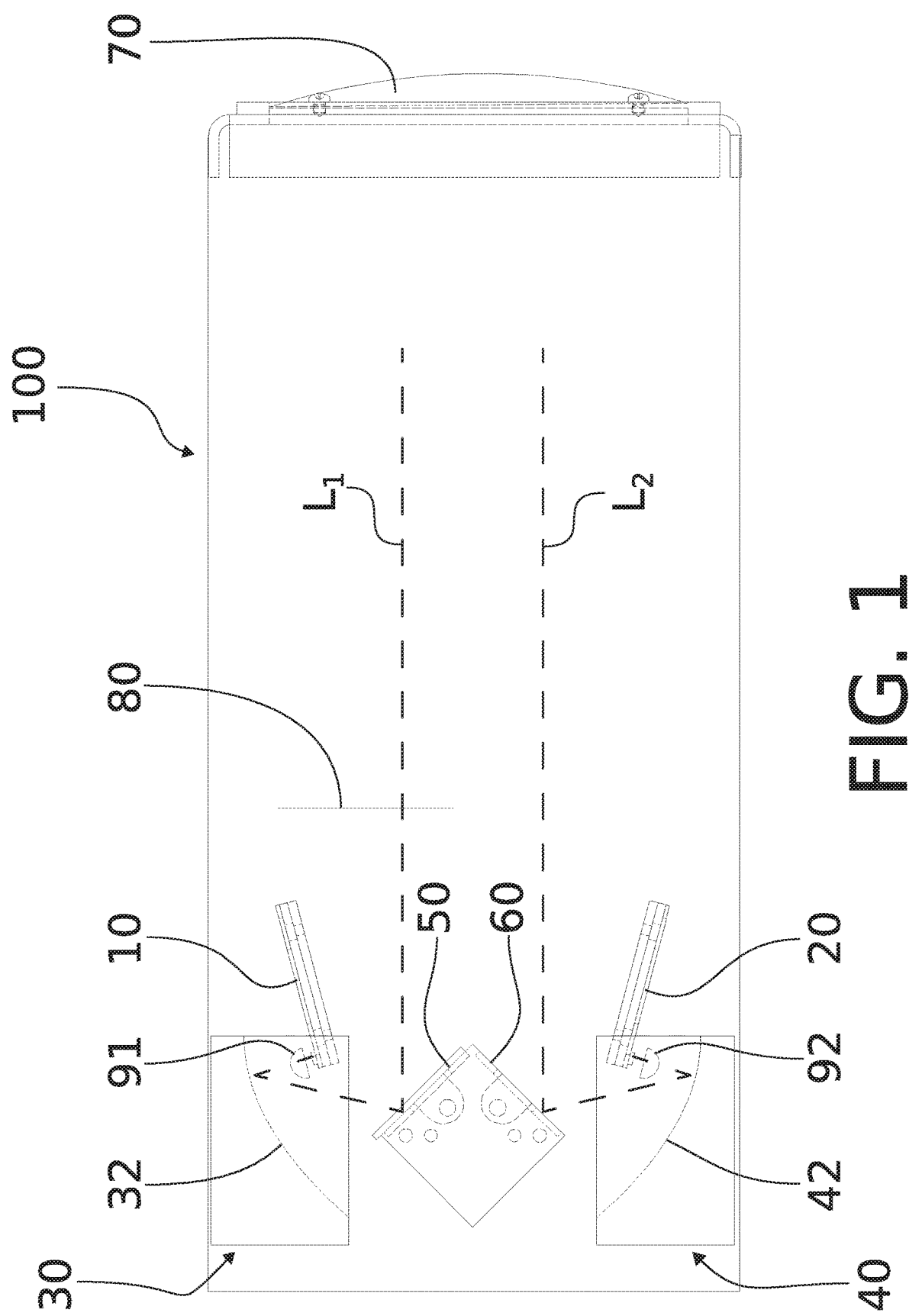
FIG. 1 illustrates a side cross-section view of a PAPI according to one embodiment.
Figure 2:
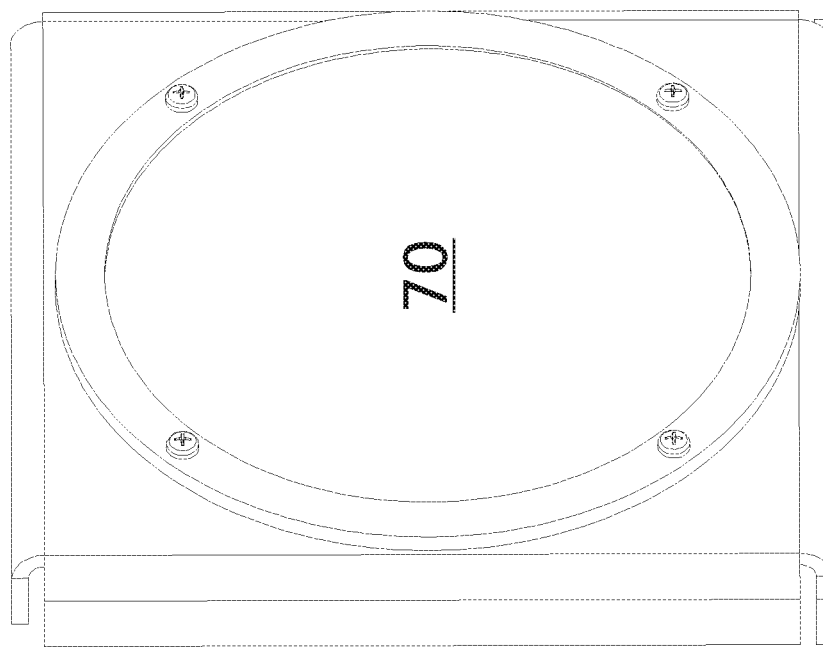
FIG. 2 illustrates a perspective view of the components of FIG. 1 without a casing.
Figure 2:
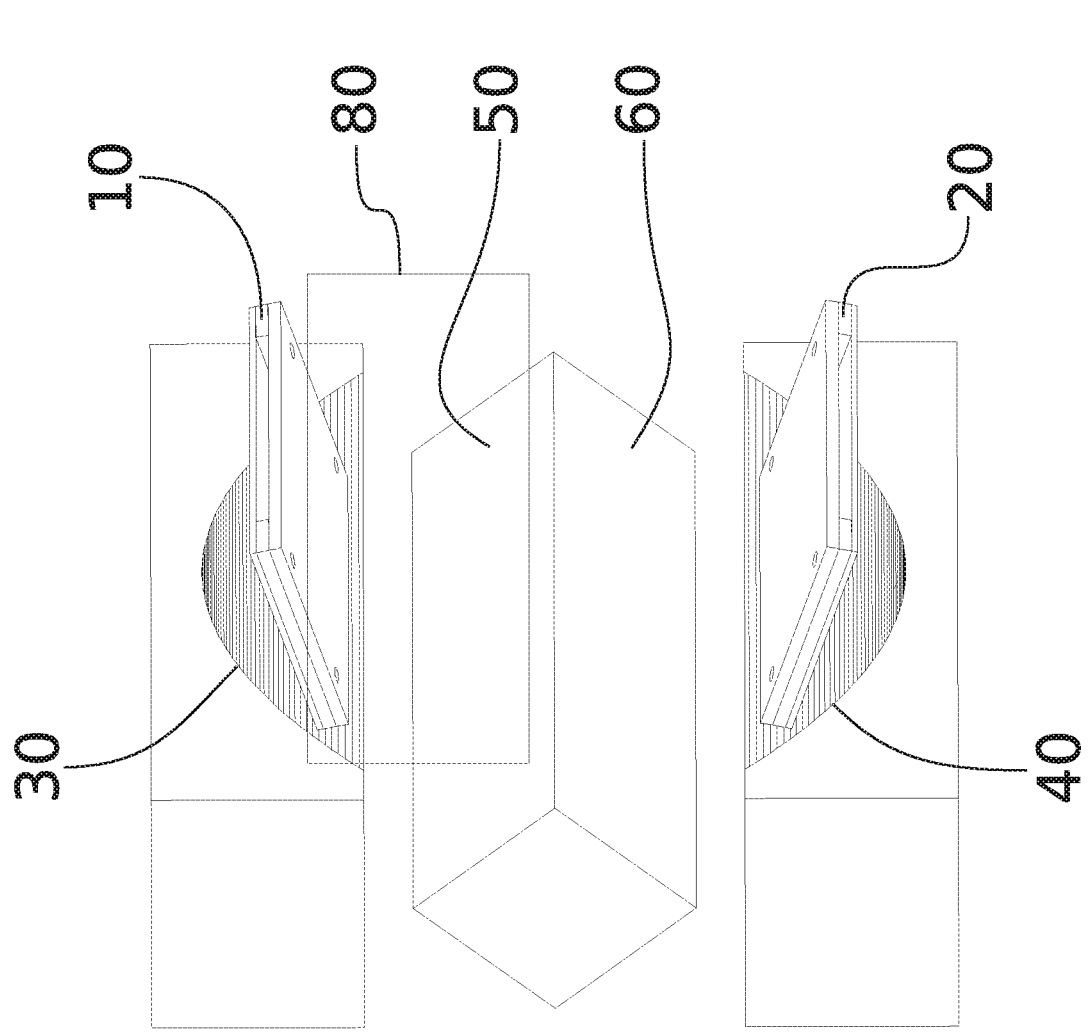

As seen from FIGS. 1 and 2, the PAPI 100 according to the illustrated embodiment is based on a conventional PAPI having a generally prismatic enclosure housing an optical unit at one end and a projector lens 70 at the other. As in conventional PAPI's, a first artificial light source 10 is provided above the center axis C of the projector lens 70 and a second artificial light source 20 below it. The optical arrangement for conveying the light from the artificial light sources 10, 20 to the projector lens 70, however, is quite different in that the light undergoes two reflections before reaching the lens 70. More particularly, the light is only modified by means of two successive reflectors without a need for further optics especially in connection with the semiconductor emitters of the artificial light sources 10, 20.

Figure 4:
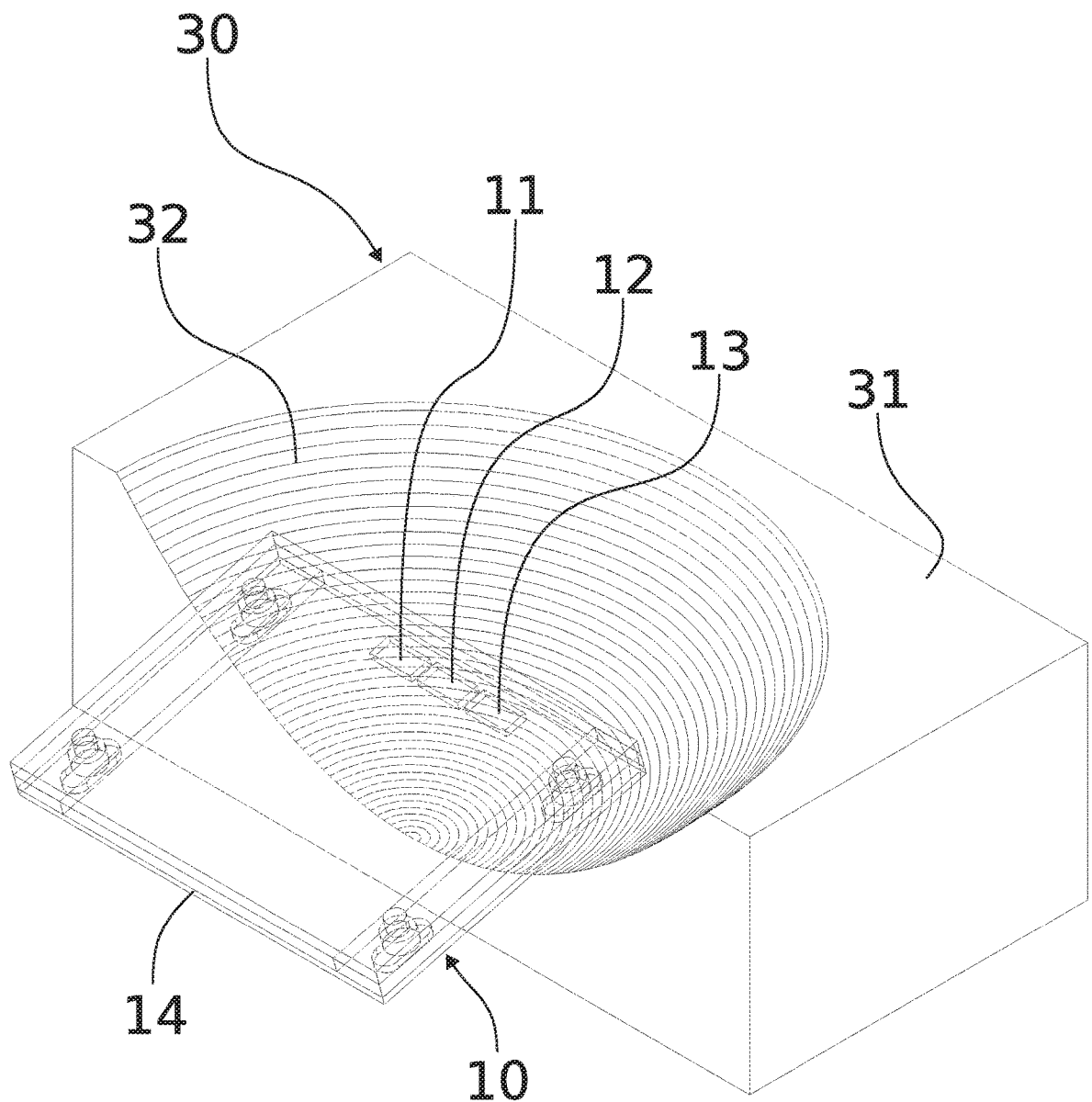
FIG. 4 illustrates a perspective detail view of the first artificial light source of FIG. 2.

FIG. 1 shows a general illustration of the principle. The first artificial light source 10 producing the red light $L_1$, is provided on one side of the center axis of the projector lens 70, namely above it in the case of FIG. 1. The red light $L_1$ is emitted directly to a concave reflector 30. The light $L_1$ is particularly emitted firstly away from the projector lens 70 and from the center axis C thereof. As shown in FIG. 4, the concave reflector 30 includes a generally prismatic body 31, which has been provided with a concave reflecting surface 32. In the illustrated embodiment, the reflector 30 is parabolic, i.e. the section of the reflecting surface 32 used for reflection is parabolic. As is also visible from FIG. 4, the artificial light source 10 includes three semiconductor emitters 11, 12, 13 mounted on a circuit board 14. The semiconductor emitters may be individual LEDs or LED bundles having several individual semiconductor emitters arranged on a single surface-mounted element. It is foreseeable to use domeless LEDs as the semiconductor elements. As the individual semiconductor emitters do not include collimating or encapsulating optics on top of each emitter, the emitted light beam may be controlled in a flexible and controlled manner. Because there is not an individual lenses provided to each emitter, the circuit board 14 may also be provided with a great number of such emitters.

Figure 5:
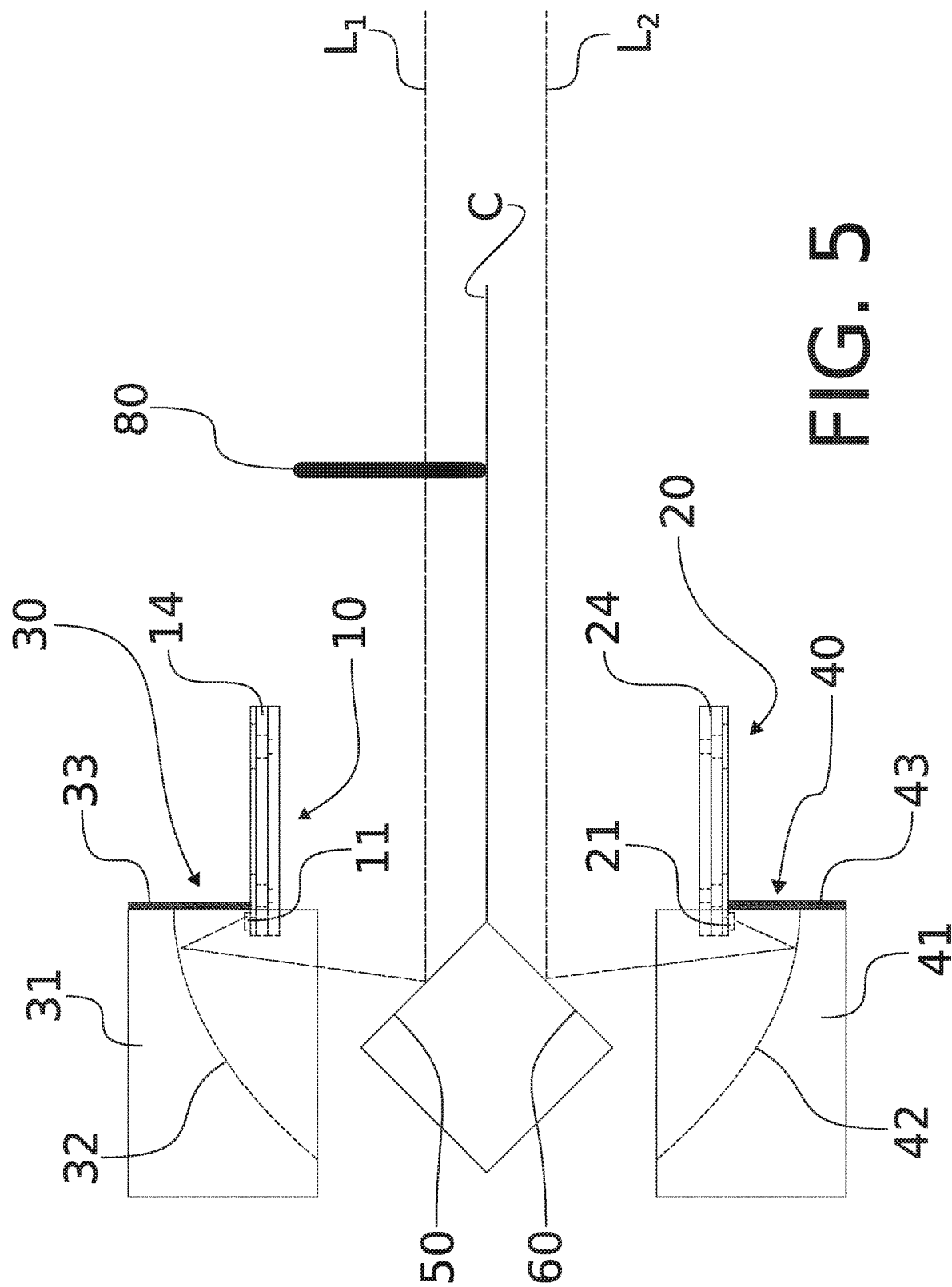
FIG. 5 illustrates a side cross-sectional sketch of a revised PAPI based on the embodiment of FIG. 1.

According to the embodiment illustrated in FIG. 5, the concave reflectors 30, 40 arranged for the first and second artificial light sources 10, 20 may be provided with an additional reflecting surfaces 33, 43, respectively, for scavenging stray light beams emitted by the first and second artificial light sources 10, 20. These additional reflecting surfaces 33, 43 may be planar or curved. The additional reflecting surfaces are positioned to reflect any light that has escaped from first and second artificial light sources 10, 20 towards the projector lens 70 to be directed to the concave reflectors 30, 40. In other words, the additional reflecting surfaces 33, 43 are positioned to guide stray light from the first and second artificial light sources 10, 20 towards the concave reflecting surfaces 32, 42. As shown in FIG. 5, the additional reflecting surfaces 33, 43 are positioned between the LED 11, 12 of the artificial light source 10, 20 and the projector lens 70 along a dimension parallel to the center axis C of the projector lens 70. By providing the concave reflectors 30, 40 with such additional reflecting surfaces 33, 43, which direct stray light, the efficiency of the PAPI is improved.

Returning to FIG. 1, wherein the lenses 91, 92 are optional. The red light beam $L_1$ may therefore be emitted by the first artificial light source 10 directly without intermediate optics to the first concave reflector 30. As the total output of the first artificial light source 10 is made up by the summed output of the individual semiconductor emitters 11, 12, 13, the light beams arrive to the concave reflector 30 in slightly different angles. Due to the concavity—particularly the parabolic nature—of the reflector, the light beams arriving at different angles are collected and focused onto a first planar reflector 50, which is arranged closer to the center axis C of the projector lens 70.

The first planar reflector 50 is arranged to receive the light $L_1$ emitted by the first artificial light source 10 via the first concave reflector 30 and to reflect the light to the projector lens 70. The light $L_1$ reflected by the first planar reflector follows the center axis C of the projector lens 70 along a path that is substantially parallel to said center axis C. As the reflective surface of first planar reflector is generally planar, some scattering may occur. The projector lens 70 is therefore configured to project the light $L_1$ received from the first planar reflector 50 meet the requirements governing the output of PAPI's.

According to a particular embodiment, a filter 80 is provided onto the path of the light $L_1$ traveling from the first planar reflector 50 to the projector lens 70. The filter 80 is configured to pass the wavelength or wavelength band of the light $L_1$ emitted by the first artificial light source. The use of a filter 80 is proposed for the reason of sharpening the transition between red and white light in the outputted light pattern of the PAPI 100.

Figure 3:
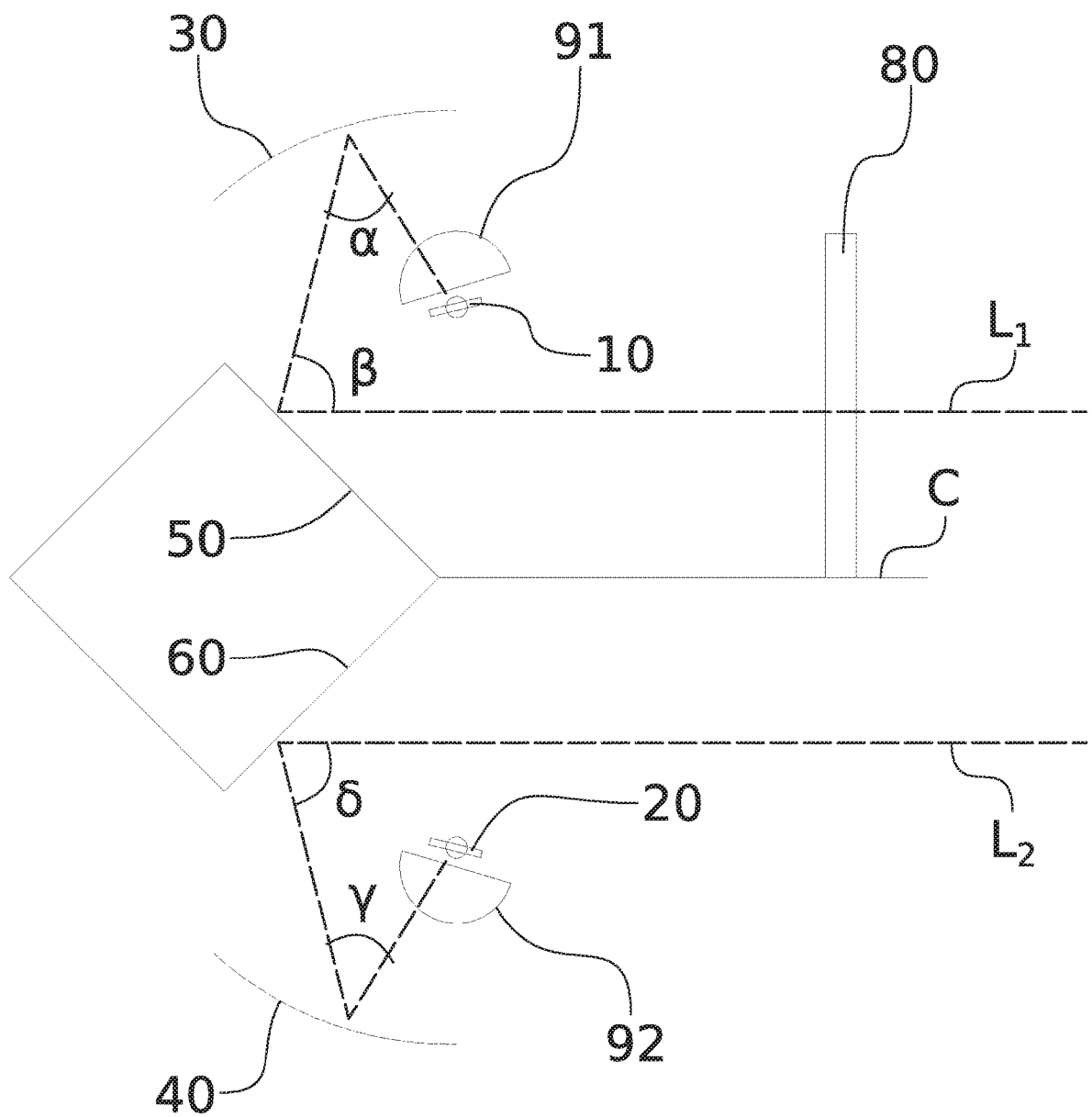
FIG. 3 illustrates a sketch of the path of the light beams emitted by the Artificial light sources of FIG. 1.

As best seen from FIG. 3, the light $L_1$ is reflected twice. The light is first directed away from the projector lens 70 and from the center axis C thereof. During the first reflection by the first concave reflector 30, the light is reflected further away from the projector lens 70 but toward the center axis C thereof over a first reflection angle $\alpha$. The light is then reflected for the second time generally along the center axis C of the projector lens 70 and towards it over a second reflection angle $\beta$. Now, the reflection angles $\alpha$, $\beta$ of the first and second reflection depend on the placement and orientation of the artificial light source, concave reflector and planar reflector as well as on the matching between the semiconductor emitters of the artificial light source and the shape of the reflecting surface of the concave reflector. In the illustrated example, the summed angle of the reflection angles $\alpha$, $\beta$ of the first and second reflection are in any case over right angle.

The second artificial light source 20 and the optical arrangement thereof is similar to that of the first artificial light source 10 but mirrored in respect to the center axis C of the projector lens 70 with the difference that the wavelength band of the second artificial light source 20 is different from the first artificial light source 10. More specifically, the second artificial light source 10 is configured to produce white light. The semiconductor emitters of the first and second artificial light sources 10, 20 are selected such to conform to the prevailing standard, such as to the Engineering Brief No. 67D of Mar. 6, 2012 by the Federal Aviation Administration of the US Department of Transportation. Thus, the output of the PAPI complies with the requirements for red and white light as set forth in the prevailing standard, such as SAE AS25050, Colors, Aeronautical Lights and Lighting Equipment, General Requirements for, paragraph 3.1, Aviation Colors. Accordingly, red and white light should in this context be understood to mean the colors referred to in the prevailing standards, such as the afore-mentioned SAE AS25050, Colors, Aeronautical Lights and Lighting Equipment, General Requirements for, paragraph 3.1, Aviation Colors.

The difference in the color of light and opposite placement in respect to the center axis C of the projector lens 70 notwithstanding, the second artificial light source 20 corresponds to the first artificial light source 10. The white light $L_2$ produced by the second artificial light source 20 is first collected by the second concave reflector 40 and reflected to the second planar reflector over a first reflection angle γ. The second planar reflector 60 receives the white light $L_2$ from the second concave reflector 40 and reflects it toward the projector lens 70 over a second reflection angle δ.

Accordingly, the red and white light L1, L2 reflected by the first and second planar reflectors 50, 60, respectively, travel generally along the center axis C of the projector lens 70. Should a portion of the white light $L_2$ be strayed from the second planar reflector 60, the filter 80 will prevent the white light $L_2$ from distorting the red light $L_1$ outputted by the projector lens 70.

According to a further embodiment, a lens 91, 92 is arranged between the first artificial light source 10 and the first concave reflector 30 or between the second artificial light source 20 and the second concave reflector 40 or both. The lens or lenses 91, 92 are configured to gather the light beams emitted by the light source 10, 20 and direct it to the concave reflector 30, 40. The purpose of the additional lens 91, 92 is to improve the efficiency of the artificial light source 10, 20 by capturing as many of the otherwise stray beams as possible. It is proposed to arrange the additional lens 91, 92 at a distance from the artificial light source 10, 20, which is domeless. The additional lens 91, 92 may be, for example, cylindrical. The lens 91, 92 may be of a suitable material, such as plastic or glass, and attached to the circuit board including the artificial light source 10, 20. The lenses 91, 92 may be used in addition to or instead of having an additional reflective surface 33, 43 as shown in FIGURES.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

REFERENCE SIGNS LIST

| | |
|---|---|
| 10 | first artificial light source |
| 11 | LED |
| 12 | LED |
| 13 | LED |
| 14 | board |
| 20 | second artificial light source |
| 21 | LED |
| 24 | board |
| 30 | first concave reflector, e.g. parabolic mirror |
| 31 | body |
| 32 | reflective surface |
| 33 | (additional) reflective surface |
| 40 | second concave reflector, e.g. parabolic mirror |
| 41 | body |
| 42 | reflective surface |
| 43 | (additional) reflective surface |
| 50 | first planar reflector |
| 60 | second planar reflector |
| 70 | projector lens |
| 80 | filter |
| 91 | first lens |
| 92 | second lens |
| C | center axis of the projector lens |
| $L_1$ | first light beam (red) |
| $L_2$ | second light beam (white) |
| α | first reflection angle of first light beam |
| β | second reflection angle of first light beam |
| γ | first reflection angle of second light beam |
| δ | second reflection angle of second light beam |
| 100 | precision approach path indicator, PAPI |

CITATION LIST

Patent Literature

US 2007/0115141 A1

The invention claimed is:

1. A precision approach path indicator (PAPI) comprising:
a first artificial light source comprising a plurality of semiconductor emitters,
a second artificial light source comprising a plurality of semiconductor emitters,
a first planar reflector for guiding light received from the first artificial light source as a first beam of an output of the PAPI,
a second planar reflector for guiding light received from the second artificial light source as a second beam substantially parallel to the first beam of the output of the PAPI,
a first concave reflector adapted to collect light emitted by the plurality of semiconductor emitters of the first artificial light source and to focus the collected light into the first beam directed to the first planar reflector,
a second concave reflector adapted to collect light emitted by the plurality of semiconductor emitters of the second artificial light source and to focus the collected light into the second beam directed to the second planar reflector, and
a projector lens configured to receive the first and second beams from the first and second planar reflectors and output the output of the PAPI.

2. The PAPI according to claim 1, wherein:
the plurality of semiconductor emitters of the first artificial light source is configured to produce light in a first wavelength band, and
the plurality of semiconductor emitters of the second artificial light source is each configured to produce light in a second wavelength band, which is different from the first wavelength band.

3. The PAPI according to claim 2, wherein:
the first wavelength band produces red light, and
the second wavelength band produces white light.

4. The PAPI according to claim 1, wherein the semiconductor emitters are LEDs.

5. The PAPI according to claim 4, wherein the LEDs are domeless.

6. The PAPI according to claim 1, wherein the PAPI further comprises a lens which is arranged between:
the first artificial light source and the first concave reflector, or
the second artificial light source and the second concave reflector, or
both,
and wherein the lens is configured to gather the light beams emitted by the light source and direct said light beams to the concave reflector.

7. The PAPI according to claim 6, wherein the lens is arranged at a distance from the artificial light source.

8. The PAPI according to claim 1, wherein the first concave reflector or the second concave reflector, or both, is/are equipped with an additional reflecting surface configured to guide stray light from the first artificial light source towards the first concave reflecting surface or from the second artificial light source towards the second concave reflecting surface, or both.

9. The PAPI according to claim 8, wherein the additional reflecting surface or surfaces is/are positioned between the semiconductor emitter(s) of the artificial light source(s) and the projector lens along a dimension parallel to the center axis of the projector lens.

10. The PAPI according to claim 1, wherein the first and second concave reflectors are parabolic.

11. The PAPI according to claim 1, wherein:
the projector lens has a center axis, and
the first and second planar reflectors are configured to reflect the light received from the first and second concave reflectors to the projector lens along the center axis of the projector lens.

12. The PAPI according to claim 1, wherein the light produced by the artificial light sources undergoes a first reflection at the concave reflector and a second reflection at the planar reflector.

13. The PAPI according to claim 1, wherein the light produced by the artificial light sources undergoes only a first reflection at the concave reflector and a second reflection at the planar reflector.

14. The PAPI according to claim 1, wherein the PAPI further comprises a filter arranged on the path of the light reflected by the first planar reflector, and wherein the filter is configured to pass only wavelengths of light belonging to the wavelength band of the first artificial light source.

15. The PAPI according to claim 1, wherein the first and second planar reflectors do not focus the light received from the first and second artificial light sources.

* * * * *